United States Patent [19]

Mackelburg et al.

[11] 4,432,079
[45] Feb. 14, 1984

[54] SYNCHRONOUS/ASYNCHRONOUS INDEPENDENT SINGLE SIDEBAND ACOUSTIC TELEMETRY

[75] Inventors: Gerald R. Mackelburg; Stanley J. Watson; Alan Gordon, all of San Diego, Calif.

[73] Assignee: The United States of America as represented by the Secretary of the Navy, Washington, D.C.

[21] Appl. No.: 317,357

[22] Filed: Nov. 2, 1981

[51] Int. Cl.³ ............................................. H04B 11/00
[52] U.S. Cl. ..................................... 367/132; 367/134; 455/40; 455/103; 455/104
[58] Field of Search ................. 367/132, 134; 455/102, 455/103, 104, 40

[56] References Cited

U.S. PATENT DOCUMENTS

| | | | |
|---|---|---|---|
| 2,401,406 | 6/1946 | Bedford et al. | 179/1.5 |
| 2,423,546 | 7/1947 | Bedford | 179/1.5 |
| 3,024,441 | 3/1962 | Saxton | 367/125 |
| 3,131,116 | 4/1964 | Pounds | 161/258 |
| 3,218,607 | 11/1965 | Brock et al. | 367/132 |
| 3,263,207 | 7/1966 | Kroamer et al. | 367/132 |
| 3,445,806 | 5/1969 | Band | 367/132 X |
| 3,614,721 | 10/1971 | Lagoe | 367/134 |
| 3,746,996 | 7/1973 | Peoples | 325/330 |
| 3,969,675 | 7/1976 | Gosling | 325/50 |
| 3,970,937 | 7/1976 | Bates et al. | 325/49 |
| 4,019,140 | 4/1977 | Swerdlow | 325/65 |
| 4,203,164 | 5/1980 | Isaak et al. | 367/134 |
| 4,208,734 | 6/1980 | Garber, Jr. et al. | 367/134 |
| 4,310,920 | 1/1982 | Hayes | 455/103 X |

Primary Examiner—Richard A. Farley
Attorney, Agent, or Firm—R. F. Beers; Ervin F. Johnston; Thomas Glenn Keough

[57] ABSTRACT

An undersea communications system provides for improved data transmission capabilities. Two separate sources of information respectively modulate the upper and the lower sidebands of an acoustic carrier. The discretely modulated sidebands are simultaneously transmitted without the acoustic carrier or the acoustic carrier can be added to allow asynchronous or synchronous demodulation and use of the two modulating informations. Separation of the information in the two discretely modulated sidebands is assured by shifting the modulating information to ultrasonic regions and filtering out upper and lower sidebands of modulating information. Next, the shifted sidebands are modulated by an acoustic carrier which, optionally, is transmitted along with the discretely modulated upper and lower sidebands. A phase locked loop in the receiver portion assures synchronous demodulation or a crystal oscillator allows asynchronous demodulation of the discretely modulated upper and lower sidebands.

11 Claims, 7 Drawing Figures

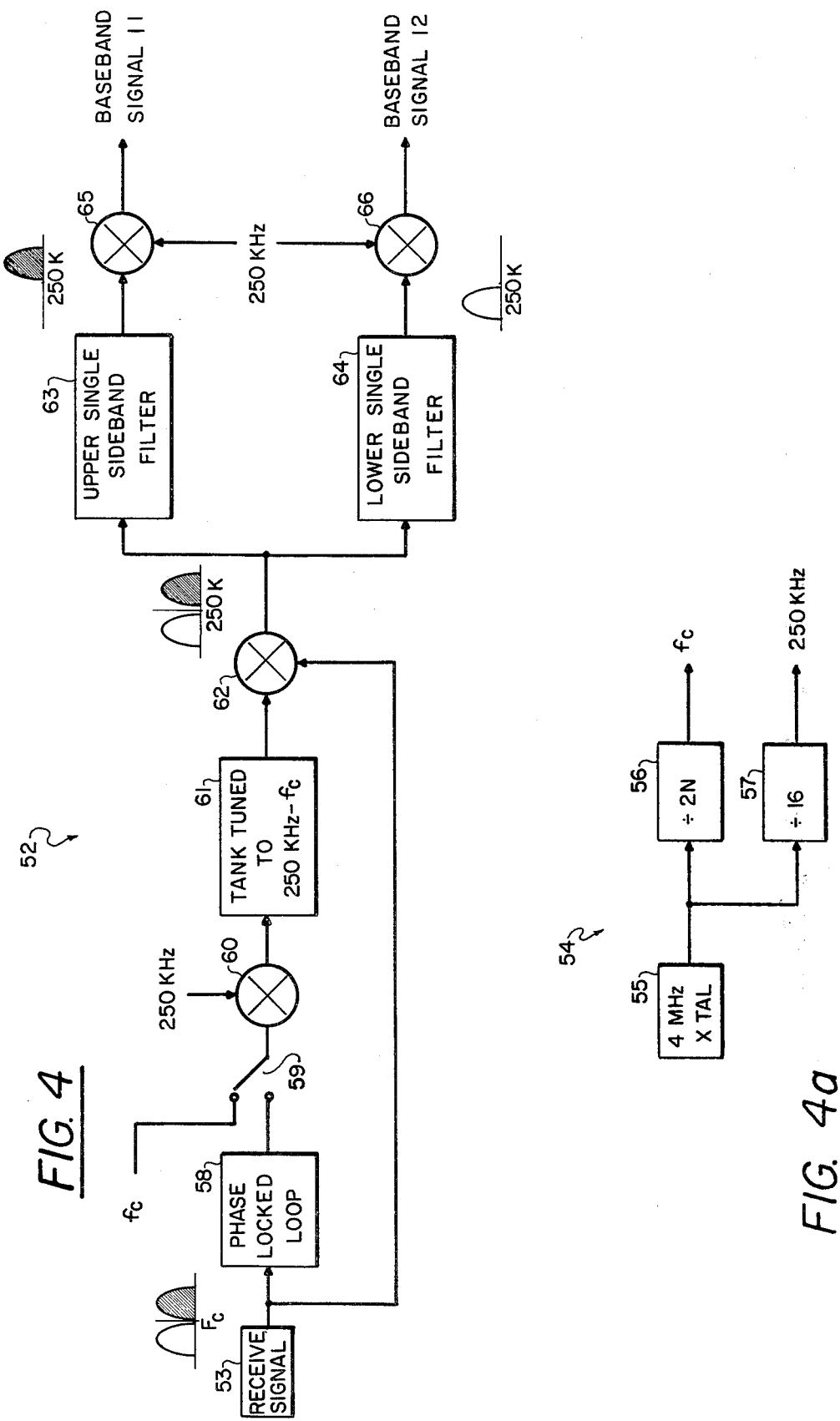

4,432,079

SYNCHRONOUS/ASYNCHRONOUS INDEPENDENT SINGLE SIDEBAND ACOUSTIC TELEMETRY

STATEMENT OF GOVERNMENT INTEREST

The invention described herein may be manufactured and used by or for the Government of the United States of America for governmental purposes without the payment of any royalties thereon or therefor.

CROSS REFERENCE TO RELATED APPLICATIONS

This application is related to a copending patent application in the U.S. Patent and Trademark Office, Ser. No. 307,403, filed Oct. 1, 1981 entitled "Single-Sideband Acoustic Telemetry" by Alan Gordon et al.

BACKGROUND OF THE INVENTION

Undersea communication systems are undergoing a continuing evolution to keep pace with the ever increasing demands made on them. Most share the use of an acoustic carrier or a related modulated scheme thereof for telemetry or bidirectional communications.

At first, marine engineers and scientists tried to adapt proven radio communication techniques to undersea applications and have met with some success. A whole family of related radio frequency communication systems developed which modulated one or both sidebands and transmitted them separately or along with a carrier. Synchronous or asynchronous demodulation at the radio receivers was performed in along predictable, expected manners so that the wide variety of radio communication techniques were acceptable for a good many applications.

The routine radio approaches that were adapted by undersea communications designers used acoustic means instead of radio frequency means for carrying the modulating information. Single sideband and redundant sidebands were acoustically modulated but the separate modulation of the transmitted upper sideband and the separate modulation of the lower sideband have not been adapted to allow an increased communication capability in the undersea environment.

Thus, there is a continuing need in the state of the art for an acoustic technique for the discrete modulation of the upper and the lower sidebands of an acoustic carrier frequency that allows for an asynchronous as well as a synchronous modulation and demodulation capability and which also provides for an ultrasonic shifting of two discrete information sources to assure their separation for transmission and reception through a water medium.

SUMMARY OF THE INVENTION

The present invention is directed to providing an improved apparatus for acoustically transmitting and receiving through a water medium. A first and a second source of modulating signals and a source of an acoustic carrier signal are coupled to a modulating means which modulates upper and lower first modulating source sidebands and upper and lower second modulating source sidebands. These are coupled to a passing means which passes only the lower first modulating source sideband and the upper second modulating source sideband. These two sidebands are coupled to a means for transmitting them through the water medium. A receiving means is properly disposed to receive remotely originating upper and lower sidebands of a modulated carrier frequency either by themselves or along with a portion of the carrier frequency. Filtering means separate a discretely modulated upper sideband and a discretely modulated lower sideband of the carrier signal so that demodulation of the two sidebands and extraction of two separate sources of information can be made by synchronous and asynchronous demodulation techniques.

An object further enhancement of the validity of the transmitted two sources is provided for by shifting the two information sources by an intermediate frequency so that state of the art filters can distinctly mask out unwanted signals in both the synchronous and asynchronous modulation and demodulation operations.

A prime object of the invention is to provide for an improved system for transmitting and receiving acoustic information through a water medium.

Another object of the invention is to provide for an undersea communication system having an asynchronous and synchronous transmission and reception of information.

Yet another object is to provide for an underwater communication system having discrete sources of information respectively modulating an upper sideband and a lower sideband of an acoustic carrier.

Still another object of the invention is to provide for discretely modulated upper and lower sidebands optionally transmitted with or without a carrier frequency to allow their separate asynchronous and synchronous demodulation.

Still another object of the invention is to provide for increasing the information content of transmitted signals by permitting the discrete modulation of the upper sideband and a lower sideband of an optionally transmitted carrier.

These and other objects of the invention will become more readily apparent from the ensuing description and claims when taken with the drawings.

BRIEF DESCRIPTION OF THE DRAWINGS

FIG. 1a depicts a typical acoustic carrier oscillator arrangement.

FIG. 4 shows an improved receiver portion of the invention.

FIG. 4a shows an oscillator arrangement for generating the acoustic carrier frequency as well as the intermediate frequency ultrasonic signal employed in demodulation.

DESCRIPTION OF THE PREFERRED EMBODIMENTS

Figure 1:
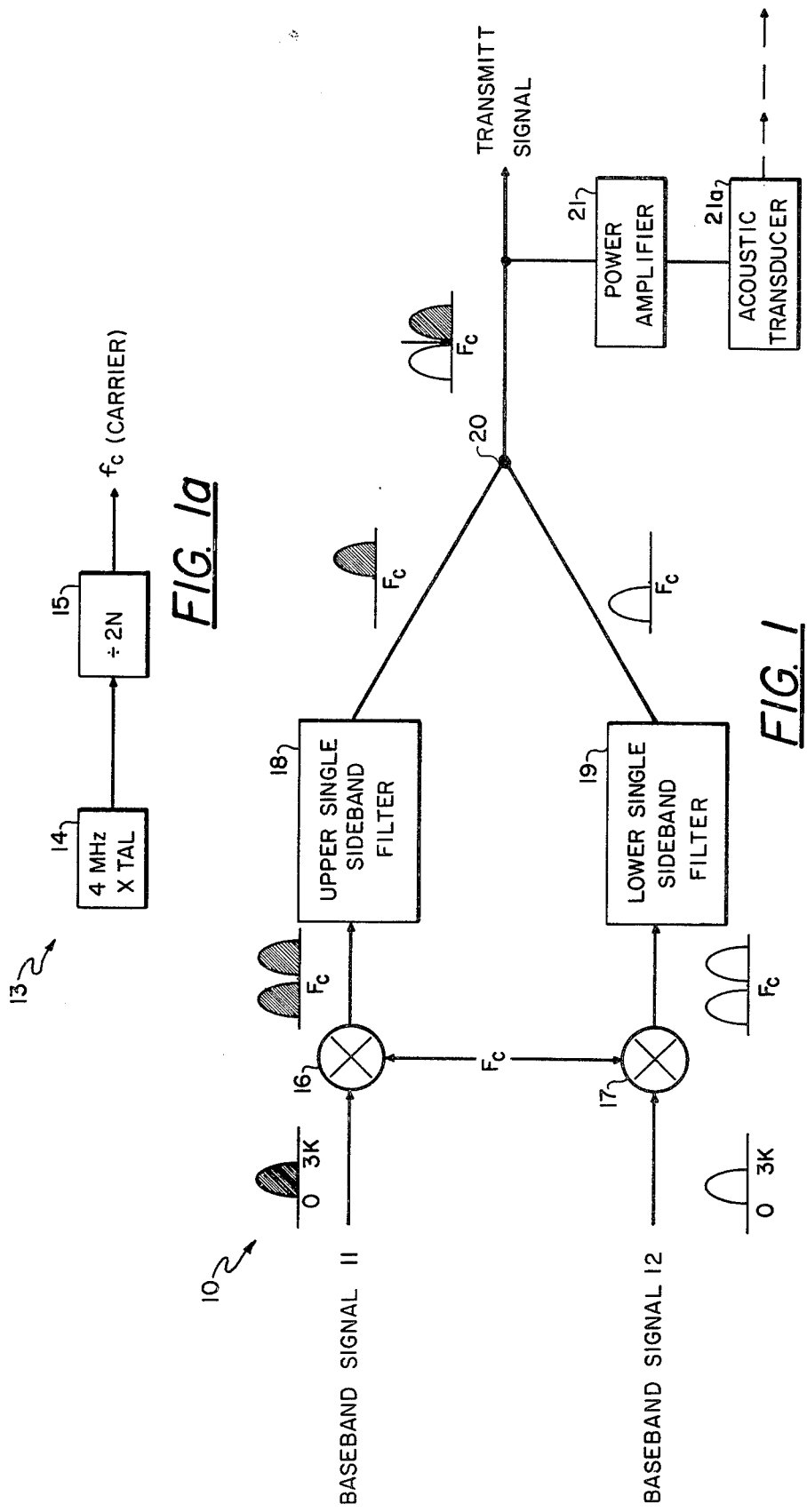
FIG. 1 is a block diagram of a transmitter portion of the invention.

Referring now to the drawings and in particular FIG. 1, a transmitter portion 10 receives a pair of base band signals 11 and 12 from suitable sources. The sources could be voice, video, digital data etc. which are desired to be transmitted and received through ter medium. Diver communications and a wide variety of telemetry applications provide the sources and for purposes of this disclosure we will assume that the baseband stretches from 255 Hz to three kHz for both signals.

A source of acoustic carrier signals 13, see FIG. 1a, is made up of a four mHz crystal source 14 and an interconnected 2 N frequency divider 15 that create an acoustic carrier $f_c$. The acoustic carrier signal is fed to a pair of balanced modulators, 16 and 17, which each produce discretely modulated upper and lower sidebands.

An interconnected upper single sideband filter 18 receives the upper and lower discretely modulated sidebands from modulator 16 to pass only the upper modulated sideband while a lower single sideband filter 19 receives the discretely modulated upper and lower sidebands from modulator 17 to pass only the lower sideband of those signals.

A summer 20 receives both the signals and passes them to a power amplifier 21 and a suitable acoustic transducer 21a for transmission to the water medium. The filters are of conventional design as are the modulators.

When only the discretely modulated upper and lower sidebands are transmitted with no carrier as described above, an asynchronous demodulation operation must follow at a distant receiver. Optionally, the capability is included for injecting the acoustic carrier $f_c$ from oscillator 13 into the summer 20 so that the acoustic carrier frequency can accompany both of the discretely modulated sidebands and all for synchronous demodulation at receiver.

Figure 2:
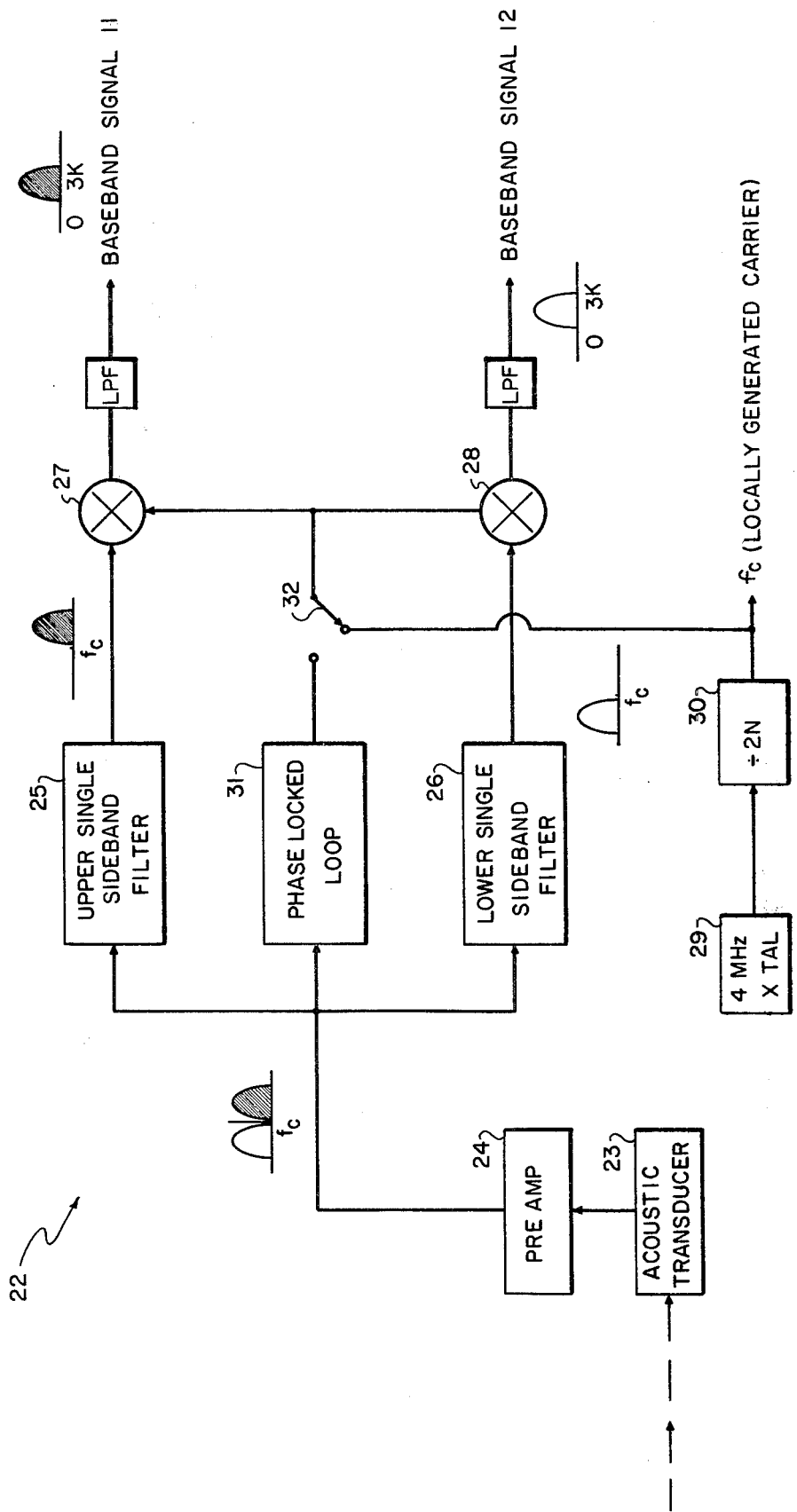
FIG. 2 depicts the general constituents of a receiver portion in accordance with this invention concept.

Looking to FIG. 2, a receiver section 22 of this inventive concept includes a hydrophone 23 disposed to receive remotely originating acoustic information signals. These signals can be discretely modulated upper and lower sidebands alone or the discretely modulated sidebands along with their carrier frequency. In either event, they are appropriately amplified in a preamplifier 40 prior to further processing.

An upper single sideband filter 25 and a lower single sideband filter 26 extract the upper sideband discretely modulated signals and the lower sidebands of discretely modulated signals respectively. Both of the signals are fed to separate balance demodulators 27 or 28, respectively, that are also coupled to receive a locally generated carrier $f_c$ coming from a four mHz crystal 29 and its interconnected frequency divider 30. This later mode of modulation is relied upon when asynchronous demodulation is called for so that the two discrete baseband signals 11 and 12 are extracted from the impinging acoustic energy.

When the carrier frequency is transmitted along with the two discretely modulated signals, a phase lock loop 55 is coupled to demodulators 27 and 28 via a suitable switch 32. Switching to the phase lock loop disconnects from the crystal oscillator. This synchronous demodulation capability enhances the signal processing capabilities of the system so that both the upper and lower discretely modulated sidebands can be synchronously asynchronously processed.

Figure 3A:
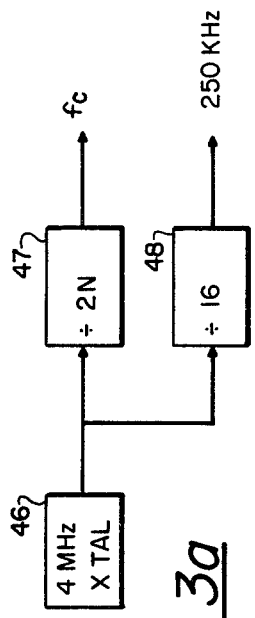
FIG. 3a depicts an oscillator arrangement for generating the acoustic carrier and the an intermediate frequency or ultrasonic frequency signal.
Figure 3:
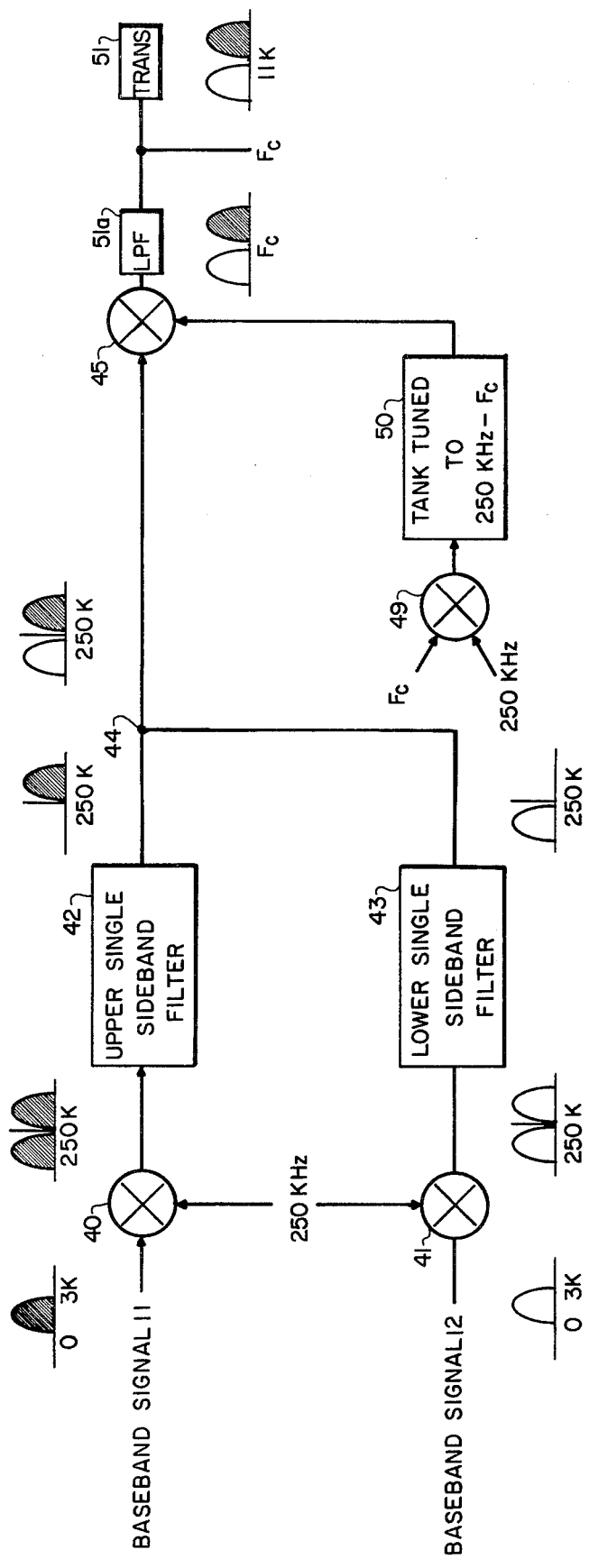
FIG. 3 sets forth a modification of the transmitter portion fabricated in accordance with the teachings of this invention.

Looking to FIG. 3 of the drawings, a modified version of this inventive concept has the two baseband signals 11 and 12 appearing once again as separate inputs. These go to balance modulators 40 and 41 where the baseband signals modulate an ultrasonic or intermediate frequency 250 kHz signal. This has the effect of shifting the baseband signals into the ultrasonic region so that when they are fed to an upper single sideband filter 42, the upper single sideband is transmitted (i.e. only the upper single sideband is passed) and in a lower single sideband filter 43 only the lower sideband is passed. The two sideband filters are of a type which have sharp responses so that unwanted distortion causing signals are more completely eliminated. Filters manufactured and commercially marketed by the Frequency Control Group of Dale Electronics, Inc. of Tempe, Ariz. have been found to be quite satisfactory for the intended use. Models of the designations FIL-0349 through FIL-0401 have been found to be quite satisfactory for eliminating and passing the ultrasonically shifted baseband information signals in this particular use. Other suitable filter designs may be selected however.

Noting FIG. 3a, an oscillator arrangement includes a crystal 46 feeding output signals of four mHz to a frequency divider 47 to produce $f_c$ and a frequency divider 48 for producing a 250 kHz ultrasonic shifting frequency.

A summer 44 receives the signals to allow their combination as ultrasonically shifted upper sideband signal and the discrete lower sideband signals to be fed to a modulator 45.

$f_c$ and the 250 KHz signals are combined in a modulator 49 fed through a tank circuit 50 and to modulator 45 where discretely modulated upper and lower sideband signals about $f_c$ are coupled to a projector transducer 51. If it is desired to send a carrier frequency along with the discretely modulated upper and lower sideband signals, the carrier frequency $f_c$ is added at a summer 51a prior to being fed to the projector transducer 51.

In FIG. 4 a receiving portion of this inventive concept receives the discretely modulated upper and lower sideband signals with or without a carrier at a hydrophone 53 which converts the incoming acoustic waves to appropriate electrical signals.

For demodulation purposes, an oscillator circuit 54, see FIG. 4a, includes a four mHz crystal 55 coupled to a first divider 56 and second divider 57 for providing demodulating acoustic carrier signals $f_c$ and the 250 kHz ultrasonic shifting signal.

When the incoming signals include a carrier signal, the output of a phase locked loop 58 is switched by switch 59 into a modulator 60. The modulator shifts the incoming carrier signal into an ultrasonic region passband that is passed by a tank circuit 61 and fed to a modulator 62. From this modulator the ultrasonically shifted signals are fed to an upper single sideband filter 63 and a lower single sideband filter 64. A discretely modulated upper sideband passes through filter 63 while a discretely modulated lower sideband passes through filter 64. The discretely modulated upper and lower sidebands are in the ultrasonic region so that the sharper cut-off filters of the type identified above can be used to assure elimination of unwanted frequencies.

A pair of following demodulators 65 and 66 receive the ultrasonically shifted upper and lower sidebands and demodulate them into the baseband signals 11 and 12 for use as intended.

Obviously, many modifications and variations of the present invention are possible in the light of the above teachings. It is therefore to be understood that within the scope of the appended claims the invention may be practiced otherwise than as specifically described.

What is claimed is:

1. An improved apparatus for acoustically transmitting and receiving through a water medium comprising:
   a first and a second source of modulating signals;
   a source of acoustic carrier signals;
   means coupled to the first and the second modulating signal sources for modulating carrier signals from the carrier signal source into upper and lower first modulating source sidebands and upper and lower second modulating source sidebands;
   means coupled to the modulating means for passing only the lower first-modulating-source sideband and the upper second-modulating-source sideband;
   means coupled to the passing means for transmitting acoustic signals representative of the lower first-modulating-source sideband and the upper second-modulating-source sideband through the water medium;
   means receiving remotely originating upper and lower sidebands of a single carrier frequency and upper and lower sidebands of a single carrier frequency along with the carrier frequency, each sideband modulated by discrete signals, for converting them to representative signals;
   means coupled to the converting means for filtering out an upper sideband of discretely modulated signals and a lower sideband of discretely modulated signals; and
   means for demodulating the upper sideband of discretely modulated signals into one source of information and the lower sideband of discretely modulated signals into another source of information.

2. An improved apparatus according to claim 1 in which the demodulating means includes a phase locked loop to provide a demodulating carrier signal when a carrier signal is converted into representative signals along with its upper and lower discretely modulated sidebands for a pair of appropriately coupled balanced modulators for synchronous operation.

3. An improved apparatus according to claim 2 in which the demodulating means includes a crystal oscillator to provide a demodulating carrier signal when the representative signals are only the discretely modulated upper and lower sidebands of an untransmitted carrier signal, the crystal oscillator being coupled to the pair of appropriately coupled balanced modulators for asynchronous operation.

4. An improved apparatus according to claim 3 further including:
   means interposed between the passing means and the transmitting means for summing a carrier signal with the lower first-modulating-source sideband and the upper second-modulating-source sideband.

5. An improved apparatus according to claim 4 in which the modulating means includes a first balanced modulator connected to receive the first-modulating-signal source to provide the upper and lower first-modulating-source sidebands and a second balanced modulator connected to receive the second-modulating-signal source to provide the upper and lower first-modulating-source sidebands.

6. An improved apparatus according to claim 5 in which the passing means includes an upper sideband filter passing only the upper second-modulating-source sideband and a lower sideband filter passing only the lower first-modulating-source sideband.

7. An improved apparatus for acoustically transmitting and receiving through a water medium comprising:
   a first and a second source of audio modulating signals discrete from one another;
   a source of intermediate frequency shifting signals;
   first means coupled to the first and second modulating signal sources for modulating the intermediate frequency shifting signals into upper and lower first-modulating-source sidebands and upper and lower second-modulating-source sidebands;
   means coupled to the first modulating means for passing only the lower first-modulating-source sideband and the upper second-modulating-source sideband;
   second means coupled to the passing means for modulating the lower first-modulating-source sideband and the upper second-modulating-source-sideband from the intermediate frequency spectrum to the acoustic spectrum;
   means coupled to the second modulating means for transmitting acoustic signals representative of the lower first-modulating-source sideband and the upper second-modulating-source sideband through the water medium;
   means receiving remotely originating acoustic separately discretely modulated upper and lower sidebands and discretely modulated upper and lower modulated sidebands along with their carrier frequency for converting them to representative signals;
   means coupled to the converting means for shifting the representative signals into the intermediate frequency system;
   means coupled to the shifting means for filtering out all but a discretely modulated upper sideband and another discretely modulated lower sideband; and
   means for demodulating the discretely modulated upper sideband and the other discretely modulated lower sideband into two different audio signals.

8. An improved apparatus according to claim 7 in which the shifting means includes a phase locked loop to provide an acoustic carrier signal when the acoustic carrier signal is transmitted along with the discretely modulated upper sideband and the other discretely modulated lower sideband to allow synchronous operation.

9. An improved apparatus according to claim 8 in which the shifting means includes a crystal oscillator to provide an acoustic carrier signal when only the discretely modulated upper sideband and the other discretely modulated lower sideband are present to allow asynchronous operation.

10. An improved apparatus according to claim 9 further including:
    means coupled to the transmitting means for summing an acoustic carrier signal with the discretely modulated upper and lower sidebands.

11. An improved apparatus according to claim 10 in which the shifting means includes a first balanced modulator connected to receive the discretely modulated upper and lower sidebands and an intermediate frequency signal from an an intermediate frequency signal source.

* * * * *